United States Patent [19]
Ufford

[11] Patent Number: 6,118,108
[45] Date of Patent: Sep. 12, 2000

[54] HEATING METHOD AND APPARATUS TO ACCELERATE FLANGED JOINT ADHESIVE CURE

[75] Inventor: David Earl Ufford, Benton, Ark.

[73] Assignee: A. O. Smith Corporation, Milwaukee, Wis.

[21] Appl. No.: 09/328,616

[22] Filed: Jun. 9, 1999

[51] Int. Cl.$^7$ .................................................. B29C 27/06
[52] U.S. Cl. ........................ 219/535; 219/228; 219/523; 156/294
[58] Field of Search ..................................... 219/535, 523, 219/533, 228, 227, 243; 156/304.2, 499, 294, 293; 285/41; 138/109

[56] References Cited

U.S. PATENT DOCUMENTS

| | | | |
|---|---|---|---|
| 2,532,564 | 12/1950 | McKay | 219/228 |
| 2,958,906 | 11/1960 | Youthed | 156/294 |
| 3,192,612 | 7/1965 | Elliott et al. | 156/294 |
| 3,383,750 | 5/1968 | Schroeder et al. | 156/294 |
| 3,802,943 | 4/1974 | Province | 219/228 |
| 3,994,515 | 11/1976 | Cotten | 156/294 |
| 4,128,264 | 12/1978 | Oldford | 285/41 |
| 4,203,475 | 5/1980 | Corey | 138/109 |
| 4,394,562 | 7/1983 | Epstein et al. | |
| 4,726,869 | 2/1988 | Matsui et al. | 156/294 |
| 4,867,822 | 9/1989 | Bannink, Jr. | 156/294 |
| 5,094,795 | 3/1992 | McMillan et al. | 264/248 |
| 5,462,706 | 10/1995 | McMillan et al. | 264/138 |
| 5,786,572 | 7/1998 | Tonazzi | 219/523 |

FOREIGN PATENT DOCUMENTS

| | | | |
|---|---|---|---|
| 314970 | 5/1989 | European Pat. Off. | |
| 55-51528 | 4/1980 | Japan | 156/294 |
| 55-55823 | 4/1980 | Japan | 156/294 |
| 349068 | 11/1960 | Switzerland | 156/294 |

*Primary Examiner*—John A. Jeffery
*Attorney, Agent, or Firm*—Michael Best & Friedrich LLP

[57] ABSTRACT

The invention relates to a method of assembling a pipe and a flanged pipe fitting. The pipe includes an end, an inner surface having an inner diameter, and an outer surface having an outer diameter. The fitting includes an inner surface defining a bore with a portion having an inner diameter larger than the pipe outer diameter. The fitting also includes a flange at least partially surrounding the bore. The method comprises the steps of applying adhesive to at least one of the pipe outer surface and the fitting inner surface, inserting the end of the pipe into the bore such that the adhesive is between the pipe outer surface and the fitting inner surface, placing at least a portion of a heating plug inside the pipe at the end of the pipe, the heating plug including a heating element, a heat transfer media substantially surrounding the heating element, and an insulating handle connected to at least one of the heating element and the heat transfer media to facilitate handling of the plug by a user, and then heating the adhesive with the heating plug, thereby curing the adhesive and forming a bond between the pipe and the fitting.

20 Claims, 1 Drawing Sheet

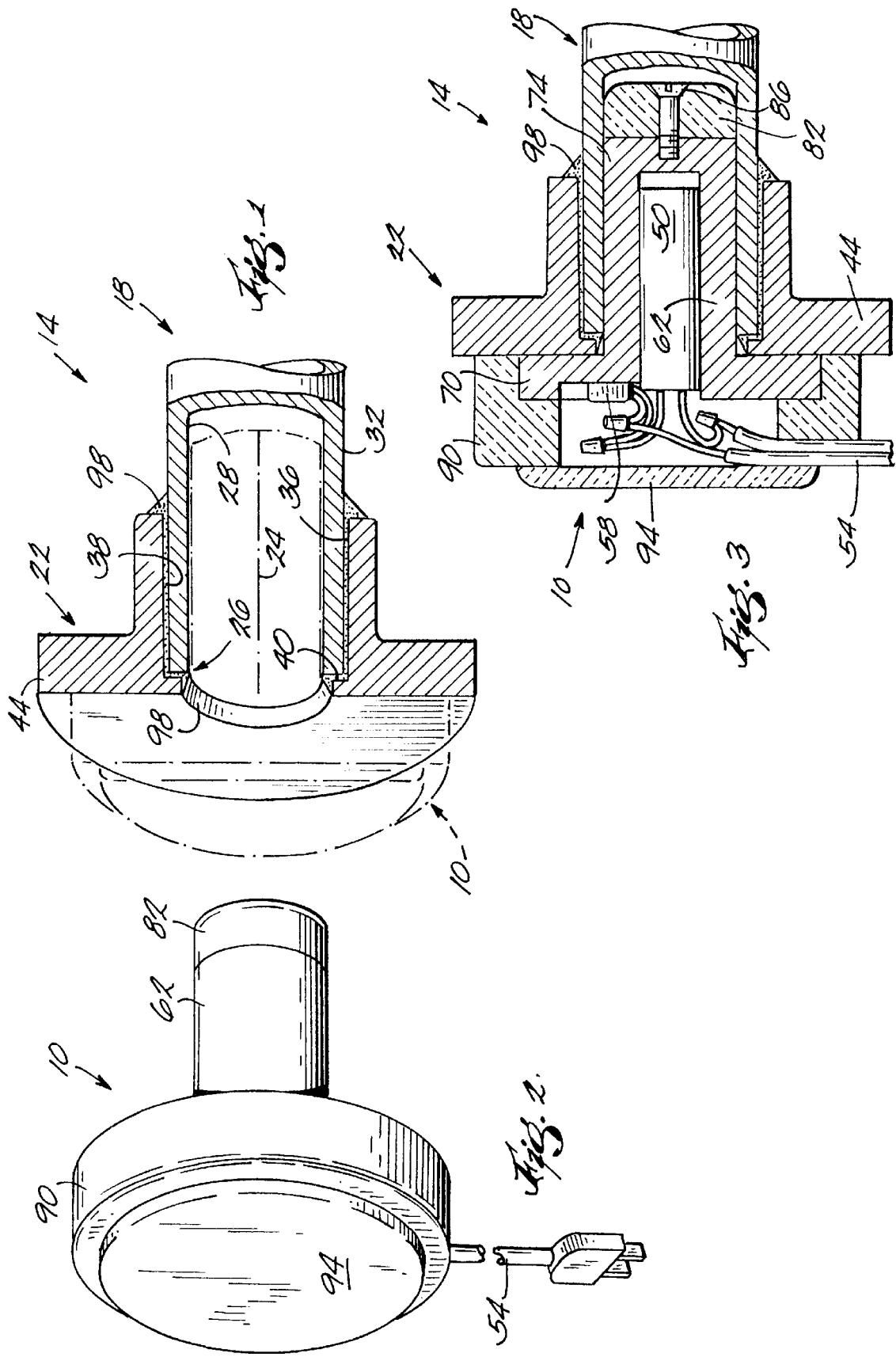

HEATING METHOD AND APPARATUS TO ACCELERATE FLANGED JOINT ADHESIVE CURE

BACKGROUND OF THE INVENTION

The invention relates to methods of assembling flanged pipe joints and more particularly to methods of adhesively bonding a flanged pipe fitting to a pipe.

It is known to assemble the flanged joints of plastic piping using adhesives that can be set or cured more rapidly with the application of heat. Typically, the adhesive is applied to the outer surface of the pipe, the inner surface of the flanged fitting's bore, or both. The end of the pipe is then inserted into the bore such that the adhesive is between the pipe's outer surface and the fitting's inner surface, creating an engagement area that will be secured by the curing of the adhesive.

One common method of applying heat to the joint is through use of an exterior heating collar. A flexible heat conducting element is wrapped around the exterior of the joint (both the fitting and the pipe) and heat is applied for a specified period of time to cure the adhesive, creating the bond between the fitting and the pipe.

Another method of applying heat to the joint involves rolling up a flexible heating collar and placing it inside the pipe at the engagement area. This internal method cures the adhesive by allowing the heat to penetrate the joint from inside the pipe rather than from outside the fitting and pipe.

Yet another method of applying heat to the joint involves the use of a hand-held heat gun that can apply heat to the joint both externally (from outside the fitting and pipe) and internally (from inside the pipe).

SUMMARY OF THE INVENTION

Achieving a complete and even joint cure is critical to forming a bond that will maximize the strength and integrity of the joint. The above-mentioned methods of applying heat are often problematic and do not always achieve the even cure necessary for a strong bond.

Flanged pipe fittings are often thick, making it difficult for external heating collars to provide uniform heat penetration to the entire joint. This often results in uneven curing and a weaker joint. Furthermore, the external heating collars usually come into contact with adhesive that oozes out at the fitting/pipe interface. This adhesive then cures onto the collar and is difficult to remove.

Internal heat application has proven more effective, however using a rolled-up heating collar is problematic. Again, the collar may come into contact with adhesive oozing out at the fitting/pipe interface. The adhesive cures onto the collar and is difficult to remove. More importantly, the collars are often too large to be rolled-up and inserted into smaller-sized pipes. This prevents many flanged joints from undergoing the more effective internal heat application.

Heat guns are also problematic in that they do not emit the controlled and consistent heat necessary for an even cure. Heat guns normally warm up gradually, but then reach temperatures that are too hot for effective curing. Uneven curing will result in a weak joint.

The present invention alleviates the problems commonly associated with the current curing methods by providing an improved method and apparatus for curing a flanged pipe joint. The inventive method provides for the controlled and even curing of the adhesive using a heat conducting plug that is insertable into the end of the pipe. The heat penetrates the joint through the wall of the pipe, evenly curing the adhesive. The plug is safe, easy to use, and easy to clean.

Specifically, the invention provides a method of assembling a pipe and a pipe fitting, preferably a flanged pipe fitting. The method comprises the steps of applying adhesive to at least one of the pipe outer surface and the fitting inner surface, inserting the end of the pipe into the fitting such that the adhesive is between the pipe outer surface and the fitting inner surface, placing at least a portion of a heating plug inside the pipe at the end of the pipe, and heating the adhesive with the heating plug, thereby curing the adhesive and forming a bond between the pipe and the fitting.

The heating plug includes a heating element, a heat transfer media substantially surrounding the heating element, and an insulating handle connected to at least one of the heating element and the heat transfer media to facilitate handling of the plug by a user. The heat transfer media preferably includes a flanged portion adjacent the insulating handle. The heat transfer media is also preferably rigid and substantially cylindrical. In one embodiment, the heat transfer media is aluminum.

The heating plug also preferably includes a thermostat for controlling the operating temperature of the heating element. An end cap may also be included, on the end of the heat transfer media opposite the flanged portion, to reduce heat loss.

Other features and advantages of the invention will become apparent to those skilled in the art upon review of the following detailed description, claims, and drawings.

BRIEF DESCRIPTION OF THE DRAWINGS

FIG. 1 is a perspective view, partially in section, of a flanged pipe joint with a heating plug shown in phantom.

FIG. 2 is a perspective view of a heating plug embodying the invention.

FIG. 3 is a sectional view of the heating plug inserted into the flanged pipe joint.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of letters to identify steps of a method or process is simply for identification and is not meant to indicate that the steps should be performed in a particular order.

DESCRIPTION OF THE PREFERRED EMBODIMENT

A heating plug 10 for use in a method for accelerating flanged joint adhesive curing is shown in FIGS. 2 and 3. A flanged joint 14 is shown in FIGS. 1 and 3 and includes (see FIG. 1) a pipe 18 and a fitting 22. The pipe 18 includes a longitudinal axis 24, an end 26, an inner surface 28, and an outer surface 32.

The fitting 22 includes an inner surface 36 defining a bore 38. At least a portion of the fitting's inner surface 36 has a diameter that is larger than the pipe outer diameter, such that the pipe 18 can be inserted into the bore 38. In the preferred embodiment, the fitting's inner surface 36 also includes a step 40 that engages the pipe end 26 when the pipe 18 is inserted into the bore 38. The fitting 22 also includes a flange 44 at least partially surrounding the bore 38. The flange 44 enables connection of the pipe 18 to another flanged joint 14 or to other structures.

The pipe 18 and fitting 22 may be any size necessary to form the desired flanged joint 14, and may be made from any material suitable for adhesive bonding. In the preferred embodiment, the pipe 18 and fitting 22 are made from fiberglass-reinforced plastic. Furthermore, it is not necessary that the joint 14 consist of circular piping and fittings, but rather may consist of tubing and fittings having any desirable cross-section.

The heating plug 10 (see FIG. 3) includes a heating element 50 that is preferably a common electrical-resistance type element. In the illustrated embodiment, the heating element is an elongated cylinder. Power is supplied to the heating element 50 (see FIGS. 2 and 3) via a power supply cord 54. As seen in FIG. 3, a thermostat 58 is connected to the power supply cord 54 and controls the operating temperature of the heating element 50. An adjustable thermostat (not shown) could also be used to allow for variable operating temperatures of the heating element 50.

The heating element 50 is substantially surrounded by a heat transfer media 62 including a flanged portion 70 on one end (the left end in the drawings). The thermostat 58 is preferably mounted to the flanged portion 70. The flanged portion 70 has an outside diameter less than the outside diameter of the pipe 18. An elongated portion 74 extends from the flanged portion 70, terminating at an opposite end (the right end in the drawings). The elongated portion 74 is preferred rigid and substantially cylindrical. The outer diameter of the elongated portion 74 is smaller than the inner diameter of the pipe 18, such that the elongated portion 74 can be inserted into the pipe 18. The heat transfer media 62 has a length in the direction of the axis 24 that is greater than the length of the fitting 22. When the heating plug 10 is inserted into the pipe 18, the heat transfer media 62 extends the entire length of the fitting 22, thereby providing for complete and even heating. In the illustrated embodiment, heat transfer media 62 is made of aluminum.

End cap 82 is connected to the right end of the elongated portion 74 by a screw 86 or by any other suitable fastening method. The end cap 82 also has an outer diameter smaller than the inner diameter of the pipe 18. The end cap 82 is preferably made from an insulating material such as plastic, and acts to reduce heat loss through the end of the elongated portion 74.

The heat plug 10 also includes an insulating handle 90 that facilitates handling of the plug by a user, allowing the user to safely grip a heated plug 10. The handle 90 is connected to at least one of the heating element 50 and the heat transfer media 62 using any suitable means including mechanical fasteners or adhesives. In the illustrated embodiment, the handle 90 is connected to the flanged portion 70 and is circular, surrounding the flanged portion 70 and housing the electrical connections between the thermostat 58, the heating element 50, and the power supply cord 54. The handle 90 need not be circular, and can be made from any insulating material, including plastic. A removable end cap 94 provides access to the electrical components. The end cap 94 may be attached to the handle 90 using any suitable means.

The plug 10 is used as follows: A thermo-setting adhesive 98, such as DS 3033 epoxy adhesive available from Smith Fiberglass Products Inc, is applied to the inner surface 36 of the fitting 22, the outer surface 32 of the pipe 18, or both. The pipe 18 (see FIG. 1) is then inserted into the bore 38 until the end 26 engages the step 40. After insertion, the adhesive 98 should be evenly distributed between the pipe outer surface 32 and the fitting inner surface 36. Due to the fit between the pipe 18 and the fitting 22, some adhesive 98 will likely ooze out at both ends of the fitting/pipe interface (as shown in FIGS. 2 and 3).

As seen in FIG. 3, the elongated portion 74 of the heating plug 10 is inserted into the pipe 18 until the insulating handle 90 engages the flange 44. When inserted, the heat transfer media 62 extends the entire length of the fitting 22 to ensure an even and complete cure. The plug 10 is heated to a desired operating temperature and is maintained at this operating temperature by the thermostat 58. Heat from the heat transfer media 62 penetrates the flanged joint 14 from inside the pipe 18. Heat is also supplied to the flange 44 via the flanged portion 70 of the heat transfer media 62. In the illustrated embodiment, the operating temperature of the plug 10 is approximately 300 degrees Fahrenheit.

After the desired curing time is reached, the user simply removes the plug 10 from the pipe 18, being careful to touch only the insulating handle 90. Once cool, the plug 10 can be easily cleaned.

Various features of the invention are set forth in the following claims.

What is claimed is:

1. A method of assembling a pipe and a pipe fitting, the pipe including an end, an inner surface having an inner diameter, and an outer surface having an outer diameter, the fitting including an inner surface defining a bore with a portion having an inner diameter larger than the pipe outer diameter, the method comprising:

applying adhesive to at least one of the pipe outer surface and the fitting inner surface;

inserting the end of the pipe into the bore such that the adhesive is between the pipe outer surface and the fitting inner surface;

placing at least a portion of a heating plug inside the pipe at the end of the pipe after inserting the end of the pipe into the bore, said plug including a heating element, a heat transfer media substantially surrounding said heating element, and an insulating handle connected to at least one of said heating element and said heat transfer media to facilitate handling of said plug by a user; and heating the adhesive with said heating plug, thereby curing the adhesive and forming a bond between the pipe and the fitting.

2. The method as claimed in claim 1, wherein said heating element is elongated, and wherein said heat transfer media is substantially cylindrical.

3. The method as claimed in claim 2, wherein said heat transfer media is rigid.

4. The method as claimed in claim 3, wherein said heat transfer media is aluminum.

5. The method as claimed in claim 3, wherein the fitting also includes a flange at least partially surrounding the bore, and wherein said heat transfer media includes a flanged portion adjacent the insulating handle.

6. The method as claimed in claim 3, wherein said heat transfer media has opposite first and second ends, wherein said handle is connected to said first end, and wherein said plug further includes an end cap connected to said second end for reducing heat loss.

7. The method as claimed in claim 1, wherein said plug further includes a thermostat for controlling the operating temperature of the heating element.

8. The method as claimed in claim 7 and further comprising setting the thermostat to a desired temperature for providing uniform heat penetration to the inner surface of the pipe, thereby facilitating an even cure of the adhesive.

9. The method as claimed in claim 8, wherein the desired temperature is approximately 300 degrees Fahrenheit.

10. The method as claimed in claim 1, wherein the inner surface of the fitting includes a stepped portion, and wherein inserting the end of the pipe into the bore includes inserting the end of the pipe into the bore until the end of the pipe engages the stepped portion.

11. The method as claimed in claim 1, wherein the fitting also includes a flange at least partially surrounding the bore, wherein said handle is substantially circular in cross section and has an outer diameter greater than the inner diameter of the pipe, and wherein placing at least a portion of said heating plug inside the pipe includes placing said heating plug inside the pipe until said handle engages either the flange or the end of the pipe.

12. The method as claimed in claim 1, wherein the pipe has a longitudinal axis, wherein the fitting has a length in the direction of the axis, wherein said heat transfer media has a length in the direction of the axis, the length of said media being greater than the length of the fitting, and wherein placing at least a portion of said heating plug inside the pipe includes placing said heating plug inside the pipe so that said media extends the entire length of the fitting.

13. A method of assembling a pipe and a flanged pipe fitting, the pipe including an internal surface, and an external surface, the fitting including an internal surface, and the fitting including a flange, the method comprising:

applying a bonding agent to at least one of the pipe external surface and the fitting internal surface;

inserting the pipe into the fitting cavity such that the bonding agent is between the pipe external surface and the fitting internal surface;

placing at least a portion of a heat transmitting device inside the pipe at the end of the pipe after inserting the pipe into the fitting cavity, said device including a heat generating component, a heat conducting material substantially surrounding said heat generating component, and a non-conductive grip connected to at least one of said heat generating component and said heat conducting material; and heating the bonding agent with said heat transmitting device, thereby causing the bonding agent to set, forming a bond between the pipe and the fitting.

14. The method as claimed in claim 13, wherein said heat conducting material is aluminum.

15. The method as claimed in claim 13, wherein said heat conducting material includes a flanged portion adjacent the non-conductive grip.

16. The method as claimed in claim 13, wherein said heat transmitting device further includes a thermostat for controlling the operating temperature of the heat generating component.

17. The method as claimed in claim 13, wherein the pipe has an end, and wherein the internal surface of the fitting includes a stepped portion, and wherein inserting the pipe into the fitting cavity includes inserting the pipe into the cavity until the end of the pipe engages the stepped portion.

18. The method as claimed in claim 13, wherein the pipe has an end, and wherein placing at least a portion of said heat transmitting device inside the pipe includes placing said heat transmitting device inside the pipe until said non-conductive grip engages either the flange or the end of the pipe.

19. The method as claimed in claim 13, wherein the pipe has a longitudinal axis, wherein the fitting has a length in the direction of the axis, wherein said heat conducting material has a length in the direction of the axis, the length of said heat conducting material being greater than the length of the fitting, and wherein placing at least a portion of said heat transmitting device inside the pipe includes placing said heat transmitting device inside the pipe so that said heat conducting material extends the entire length of the fitting.

20. A method of assembling a pipe and a pipe fitting, the pipe including an end, an inner surface having an inner diameter, and an outer surface having an outer diameter, the fitting including an inner surface defining a bore with a portion having an inner diameter larger than the pipe outer diameter, the method comprising:

applying adhesive to at least one of the pipe outer surface and the fitting inner surface;

inserting the end of the pipe into the bore such that the adhesive is between the pipe outer surface and the fitting inner surface;

placing at least a portion of a heating plug inside the pipe at the end of the pipe, said plug including an elongated heating element, a substantially cylindrical, rigid heat transfer media substantially surrounding said heating element, said heat transfer media having opposite first and second ends, an insulating handle connected to said first end of said heat transfer media to facilitate handling of said plug by a user; and an end cap connected to said second end of said heat transfer media for reducing heat loss; and heating the adhesive with said heating plug, thereby curing the adhesive and forming a bond between the pipe and the fitting.

* * * * *